United States Patent
Peng (10) Patent No.: US 9,470,897 B2
(45) Date of Patent: *Oct. 18, 2016

(54) FIBER ARRAY LIGHT SOURCE

(71) Applicant: PHOTONEDGE INC., Pleasanton, CA (US)

(72) Inventor: Song Peng, Pleasanton, CA (US)

(73) Assignee: PHOTONEDGE INC., Pleasanton, CA (US)

(*) Notice: Subject to any disclaimer, the term of this patent is extended or adjusted under 35 U.S.C. 154(b) by 100 days.

This patent is subject to a terminal disclaimer.

(21) Appl. No.: 14/493,819

(22) Filed: Sep. 23, 2014

(65) Prior Publication Data

US 2015/0077717 A1    Mar. 19, 2015

Related U.S. Application Data

(63) Continuation-in-part of application No. 14/488,186, filed on Sep. 16, 2014.

(60) Provisional application No. 61/881,549, filed on Sep. 24, 2013, provisional application No. 61/878,729, filed on Sep. 17, 2013.

(51) Int. Cl.
   *G03B 21/28*    (2006.01)
   *G02B 27/14*    (2006.01)
   *G02B 27/10*    (2006.01)

(52) U.S. Cl.
   CPC .......... *G02B 27/141* (2013.01); *G02B 27/1033* (2013.01); *G03B 21/28* (2013.01)

(58) Field of Classification Search
   CPC .. G03B 21/28; G03B 21/145; G03B 21/008; G03B 21/2073; H04N 9/315; H04N 9/3105
   See application file for complete search history.

(56) References Cited

U.S. PATENT DOCUMENTS

| | | | |
|---|---|---|---|
| 6,874,890 B2* | 4/2005 | Haino | G03B 21/00 348/757 |
| 2009/0033875 A1* | 2/2009 | King | G03B 21/005 353/31 |
| 2010/0328632 A1* | 12/2010 | Kurosaki | G03B 21/204 353/98 |
| 2013/0100421 A1* | 4/2013 | Hsu | G03B 21/204 353/33 |

* cited by examiner

*Primary Examiner* — Sultan Chowdhury
(74) *Attorney, Agent, or Firm* — Peter Su; Dentons US LLP (57) ABSTRACT

A system and method for providing a fiber array light source with individually controlled multiple-wavelength outputs are disclosed. A single spatial light modulator (SLM) outputs an image light of a first wavelength and an image light of a second wavelength. An overlap image is produced based on the image light of the first and second wavelengths. A fiber array receives light associated with the overlap image so that each individual optical fiber in the fiber array corresponds to multiple pixels on the SLM.

39 Claims, 7 Drawing Sheets

FIBER ARRAY LIGHT SOURCE

CROSS REFERENCE TO RELATED APPLICATIONS

The present application is a Continuation-In-Part Patent Application of U.S. Non-Provisional patent application Ser. No. 14/488,186, filed on Sep. 16, 2014, which claims priority to U.S. Provisional Application Ser. No. 61/881,549, filed on Sep. 24, 2013, and claims priority to U.S. Provisional Application Ser. No. 61/878,729 filed on Sep. 17, 2013, all of which are incorporated by reference herein in their entireties.

FIELD OF THE INVENTION

The present invention relates generally to a field of optics, and more particularly to an imaging system and method for producing a multiplexed image.

BACKGROUND

Many industrial applications require two or more independent optical images of different wavelengths or colors to be simultaneously projected onto the same specimen. As an example, in optogenetics research, a blue image can be used to excite certain neurons while an orange or red image can be used to silence some other neurons.

In general, a spatial light modulator ("SLM") may be used to generate an image to be projected onto a specimen. One conventional solution is to use multiple SLMs, where each generates an image of a single color, and then combine the images into a single image. An example of such a system is a three-panel color projector for display applications.

However, the use of a system having multiple SLMs has several drawbacks. Such system is expensive and requires a complex optical layout arrangement. Also, it is not particularly suitable for applications requiring a space-efficient compact design.

SUMMARY OF THE INVENTION

The present invention provides a solution to alleviate such problems. More particularly, the present invention provides systems and methods to generate simultaneous multi-wavelength images utilizing a single SLM. Additionally, the systems and methods of the present invention provide a fiber array light source in which, for instance, individual optical fibers can selectively output light of multiple different wavelengths.

In one embodiment, an optical imaging system is provided. The optical imaging system comprises a spatial light modulator (SLM) that receives light of a first wavelength and light of a second wavelength, and outputs an image light of the first wavelength and an image light of the second wavelength, the first and second wavelengths being different from each other.

The optical imaging system further comprises (i) a first dichroic beam splitter that receives the image light of the first and second wavelengths from the SLM, and reflects the image light of the first wavelength in a first direction and transmits the image light of the second wavelength in a second direction, (ii) a first mirror that receives the image light of the first wavelength from the first dichroic beam splitter and reflects the image light of the first wavelength at a first angle, (iii) a second mirror that receives the image light of the second wavelength from the first dichroic beam splitter and reflects the second wavelength at a second angle, (iv) a second dichroic beam splitter that receives the image light of the first wavelength from the first mirror and the image light of the second wavelength from the second mirror, and recombines the image light of the first and second wavelengths to produce an overlap image, and (v) a fiber array that receives light associated with the overlap image.

In another embodiment, an optical imaging method is provided. In the optical imaging method, a single spatial light modulator (SLM) is used to produce an image having a first image half associated with a first wavelength and a second image half associated with a second wavelength. The first image half is shifted in a first direction and the second image half is shifted in a second direction different from the first direction such that at least a portion of the first image half overlaps at least a portion of the second image half. The overlapped portions are then output as an overlap image associated with the first and second wavelengths. Further, the overlap image is projected onto a fiber array.

Additional features and advantages of embodiments will be set forth in the description, which follows, and in part will be apparent from the description. The objectives and other advantages of the invention will be realized and attained by the structure particularly pointed out in the example embodiments in the written description and claims hereof as well as the appended drawings. It is to be understood that both the foregoing general description and the following detailed description are illustrative and explanatory and are intended to provide further explanation of the invention as claimed.

BRIEF DESCRIPTION OF THE DRAWINGS

Various embodiments of the present invention are illustrated by way of example and are not limited to the following figures.

DETAILED DESCRIPTION

Various embodiments and aspects of the invention will be described with reference to details discussed below, and the accompanying drawings will illustrate the various embodiments. The following description and drawings are illustrative of the invention and are not to be construed as limiting the invention.

In this regard, different arrangements described herein are provided by way of example only, and other arrangements and elements can be added or used instead and some elements may be omitted altogether. Also, those skilled in the art will appreciate that many of the elements described herein are functional entities that may be implemented as discrete components or in conjunction with other components, in any suitable combination and location, and various functions could be carried out by software, firmware and/or hardware.

Multiplex System

Figure 1:
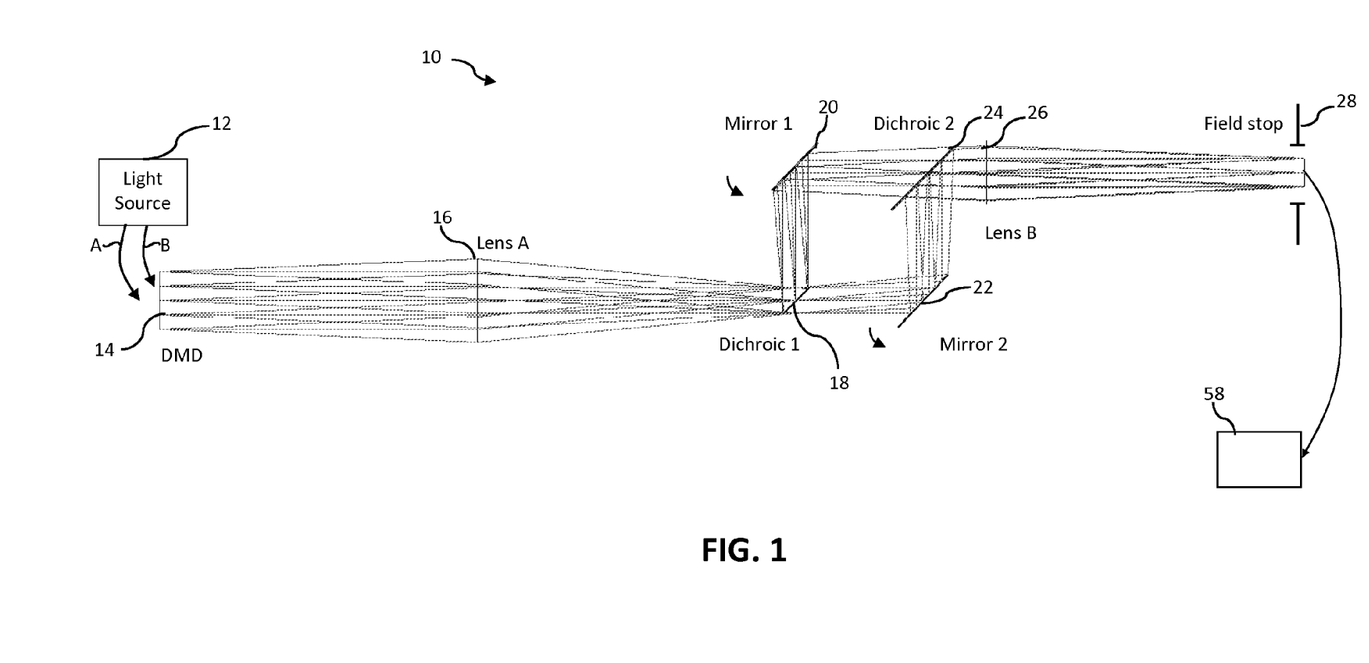
FIG. 1 illustrates an optical imaging system arranged in accordance with one embodiment of the present invention.

FIG. 1 depicts an optical imaging system 10 arranged in accordance with an illustrative embodiment of the present invention.

As shown in FIG. 1, the optical imaging system 10 comprises a light source 12 that may coupled to a single spatial light modulator ("SLM") 14 via a beam splitter and/or other optical components (not shown). The optical imaging system 10 further comprises a first lens 16 (also referred to as "Lens A"), a first dichroic beam splitter 18 (also referred to as "Dichroic 1"), a first mirror 20 (also referred to as "Mirror 1"), a second mirror 22 (also referred to as "Mirror 2"), a second dichroic beam splitter 24 (also referred to as "Dichroic 2"), a second lens 26 (also referred to as "Lens B"), and a field stop 28 (also referred to as "Field stop").

In accordance with the illustrative embodiment, the light source 12 is configured to illuminate the SLM 14 with light having different optical properties. In particular, in the illustrative embodiment, the light source 12 illuminates the SLM 14 with light of a first wavelength and light of a second wavelength that is different from the first wavelength. In the illustrative embodiment, the first wavelength is a shorter wavelength associated with a first color (e.g., a wavelength of approximately 450-495 nm corresponding to a blue color), while the second wavelength is a longer wavelength associated with a second color (e.g., a wavelength of approximately 620-740 nm corresponding a red color) different from the first color. Alternatively, the first wavelength could be a longer wavelength, while the second wavelength could be a shorter wavelength. For the purpose of example, in FIG. 1, the light directed onto the SLM 14 is denoted as beams "A" and "B," where the beam A corresponds to the light of the first wavelength and the beam B corresponds to the light of the second wavelength.

The light source 12 may be any suitable one or more sources of light, such as LED(s) and/or solid-state laser device(s). For example, the light source 12 may be a single light source capable of simultaneously generating light of two or more different wavelengths (e.g., a white light source containing multiple wavelengths). Alternatively, the light source 12 may be multiple light sources each individually generating light of a given wavelength. Further, in the illustrative embodiment, the light from the light source 12 may pass through any suitable optical component(s).

To illustrate, the light source 12 may be two or more light sources producing separate light beams with different wavelengths (e.g., a blue light beam and a red light beam), and a beam combiner can be disposed in an illumination light path between the light source 12 and the SLM 14 to combine those separate light beams and direct them onto the SLM 14. Those skilled in the art will appreciate that the beam combiner can be, e.g., a dichroic beam splitter that can separate multiple light beams into separate light beams of different wavelengths but can also be configured to function as a combiner to combine light beams of different wavelengths.

In the illustrative embodiment, the first-wavelength light beam A and the second-wavelength light beam B are directed onto the SLM 14 that, in turn, can modulate each wavelength independently. Preferably, the SLM 14 is a digital micromirror device ("DMD"), as shown in FIG. 1. However, in other embodiments, the SLM 14 may be, for instance, in the form of a liquid crystal display ("LCD") device including an imaging portion made up of a pixel array.

As those skilled in the art will recognize, a typical DMD will include a large number of microscopic mirrors that each represent an individual pixel and can be controlled to be either in an "on" state or an "off" state in accordance with binary data. The mirrors/pixels are arranged in a two-dimensional array of rows and columns, and the DMD can modulate incoming light in accordance with an image data to produce a desired output image. Further, the dimensions of the pixel array will depend on the resolution of the DMD (e.g., 1024 rows by 768 columns).

As a general matter, in accordance with the illustrative embodiment, light output by the SLM 14 will be then processed through the elements 16-28 of the optical imaging system 10 to produce an overlap image based on images of multiple different wavelengths or colors. The operation and remainder of the optical imaging system 10 will be now explained in more detail with reference to a flow chart of FIG. 2 illustrating an exemplary set of functions carried out in the optical imaging system 10.

Figure 2:
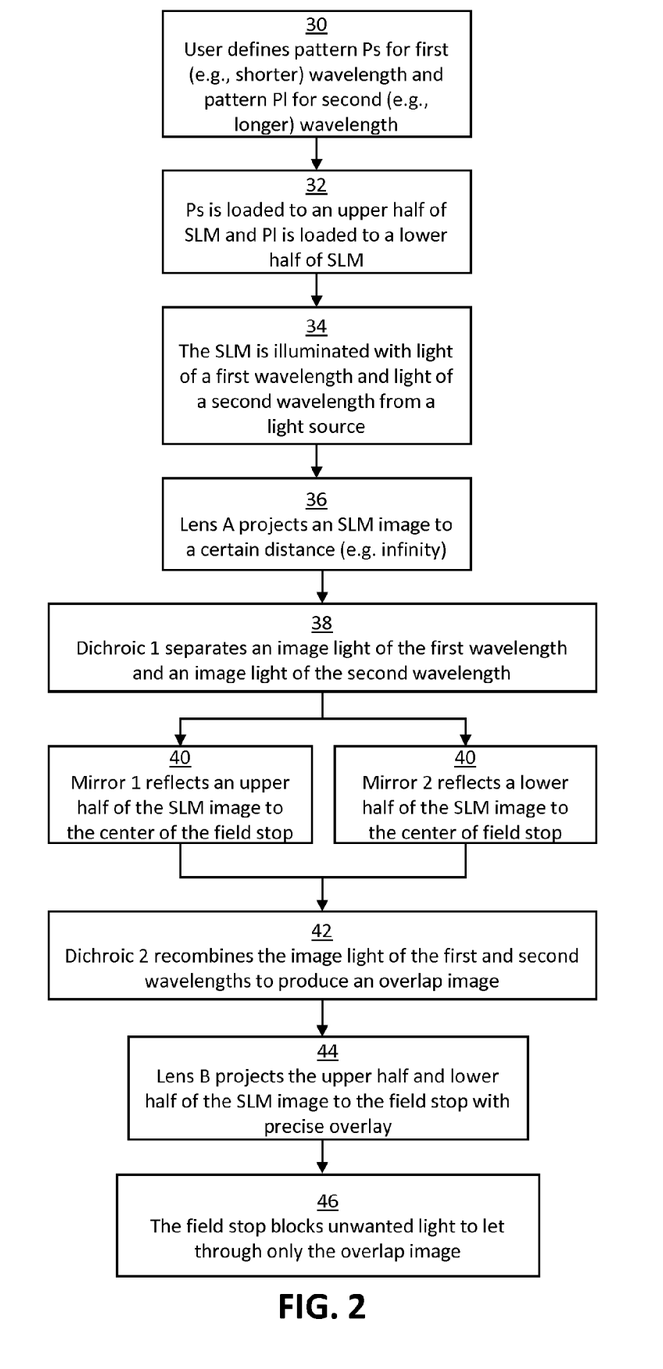
FIG. 2 is a flow chart showing an exemplary set of functions carried out using the optical imaging system of FIG. 1.

As shown in FIG. 2, at step 30, a user defines an image pattern Ps associated with the first wavelength and an image pattern Pl associated with the second wavelength. As noted above, in the illustrative embodiment, the first wavelength is a shorter wavelength associated with the first color, such as blue, and the second wavelength is a longer wavelength associated with the second color, such as red.

Figure 3A:
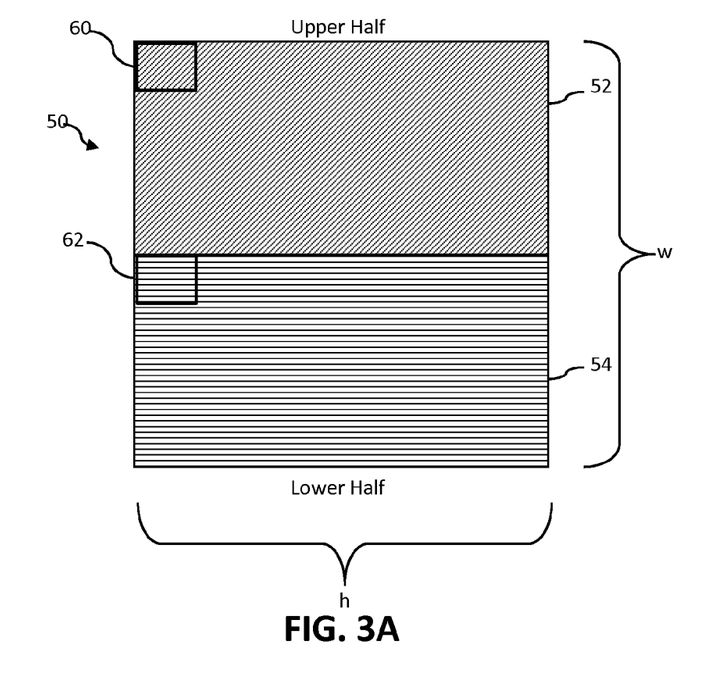
FIG. 3A illustrates an example of an SLM image, in accordance with the present invention.

At step 32, the image pattern Ps is loaded to an upper half of the SLM 14, and the image pattern Pl is loaded to a lower half of the SLM 14. Alternatively, the image pattern Pl may be loaded to the upper half of the SLM 14, and the image pattern Ps may be loaded to the lower half of the SLM 14. As used herein, the upper and lower halves of the SLM 14 will refer respectively to upper and lower halves of a pixel array of SLM 14 that produces an image, or a frame, output by the SLM 14. Further, the image pattern Ps represents first image data according to which the SLM 14 will modulate light input to a half of the SLM 14 loaded with the image pattern Ps to generate an image light in that half of the SLM 14. On the other hand, the image pattern Pl represents second image data according to which the SLM 14 will modulate light input to a half of the SLM 14 loaded with the image pattern Pl to generate an image light in that half of the SLM 14. FIG. 3A shows an example of an SLM image 50 output by the SLM 14, with the upper and lower halves of the SLM 14 denoted respectively.

Note that in the particular optical arrangement of FIG. 1, at the field stop 28, the image of the SLM 14 would be inverted, meaning that the SLM image at the field stop 28 would be upside down and/or left-to-right relative to the original SLM image at the output of the SLM 14. However, to avoid confusion, throughout the present description, the phrases "upper half," "lower half," "shift up," "shift down," "shift left," and "shift right" are always used with reference to the original image of the SLM 14, ignoring the image inverting property associated with the particular optical arrangement illustrated in FIG. 1.

Although not shown, one skilled in the art will recognize that the SLM 14, such as a DMD, will be configured with suitable hardware, processing unit(s), memory, software/logic modules, input lines, buses, and the like, to process the image patterns Ps and Pl input into the SLM 14 and load them into appropriate portions of the pixel array of the SLM 14. In this regard, data represented by the image patterns can be loaded to the pixel array in any suitable fashion, such as on a row-by-row basis.

As shown in FIG. 3A, the SLM image 50 has an upper half 52 and a lower half 54. As shown in FIG. 3A, the SLM image 50 has a two-dimensional rectangular shape, with a width "w" and a height "h." In accordance with the illustrative embodiment, the upper half 52 of the SLM image 50 corresponds to the upper half of the SLM 14, while the lower half 54 of the SLM image 50 corresponds to the lower half of the SLM 14. Accordingly, an image corresponding to the image pattern Ps associated with the first (shorter) wavelength will be generated in the upper half 52 of the SLM image 50, while an image corresponding to the image pattern Pl associated with the second (longer) wavelength will be generated in the lower half 54 the SLM image 50.

As noted above, the light of the first wavelength and the light of the second wavelength from the light source 12 are illuminated onto the SLM 14. Hence, referring back to FIG. 2, at step 34, the SLM 14 is illuminated with the light of the first wavelength and the light of the second wavelength. Note that, in the present embodiment, the whole SLM 14 (or more specifically, the whole SLM pixel array) is illuminated with the light of the first wavelength and the light of the second wavelength. As such, the SLM 14 will modulate both the light of the first wavelength and the light of the second wavelength according to the image patterns Ps and Pl to produce the SLM image 50. On the output of the SLM 14, the SLM image 50 will contain an image light associated with the first wavelength and an image light associated with the second wavelength.

At step 36, the first lens 16 projects the SLM image 50 to a certain distance away from the SLM 14. In the illustrative embodiment, the first lens 16 is a collimated lens that projects the SLM image 50 to infinity. However, in other embodiments, it may be possible to use a different type of lens or another optical component (e.g., a concave mirror). As will be described later, the second lens 26 refocuses the SLM 50 image at a back focal plane of the lens 26. However, other conjugate lens positions can be possible as well.

At step 38, the first dichroic beam splitter 18 separates the image light of the first wavelength and the image light of the second wavelength. In the illustrative embodiment, the image light of the first wavelength gets reflected in a first direction and the image light of the second wavelength gets transmitted in a second direction. As shown in FIG. 1, in this case, the image light of the first wavelength gets reflected upward towards the first mirror 20, while the image light of the second wavelength gets transmitted towards the second mirror 22.

In the illustrative embodiment, each of the mirrors 20 and 22 is tilted at an angle θ (as indicated by the arrows in FIG. 1) relative to a horizontal axis that passes though the center of the SLM 14 and the center of the first lens 16. The angle θ at which the mirrors 20 and 22 are each tilted relative to the horizontal axis is such that the upper half 52 of the SLM image 50 and the lower half 54 of the SLM image 50 will be centered along a final optical axis that passes through the center of the second lens 26 and the center of the field stop 28.

At step 40, the first mirror 20 tilted at the angle θ reflects the upper half 52 of the SLM image 50 to the center of the field stop 28, and the second mirror 22 tilted at the angle θ reflects the lower half 54 of the SLM image 50 to the center of the field stop 28. This causes a shift of the upper and lower halves 52 and 54 that results in an overlap between the upper and lower halves 52 and 54 when the image light of the first wavelength and the image light of the second wavelength are recombined. Namely, the SLM image 50 appearing at the first mirror 20 is shifted spatially such that the upper half 52 of the SLM image 50 is shifted downwards, while the SLM image 50 appearing at the second mirror 22 is shifted spatially such that the lower half 54 of the SLM image 50 is shifted upwards.

In the illustrative embodiment, the angle θ is given by the following formula:

$$\theta = 45° + a\tan(w/(8*F_a)), \text{ where}$$

a tan is arc tangent, w is a full width of the SLM image 50, and $F_a$ is a focal length of the first lens 16.

In the present disclosure, the width of the SLM image 50 is pictorially denoted in FIG. 3A. Further, note that, although the first lens 16 projects the SLM image 50 to infinity, one skilled in the art would understand that such lens would have a finite focal length $F_a$ used in calculating the angle θ.

Then, at step 42, the second dichroic beam splitter 24 recombines the image light of the first wavelength and the image light of the second wavelength to produce an overlap image. For example, in the illustrative embodiment, the second dichroic beam splitter 24 is configured such that the image light of the first wavelength is transmitted and the image light of the second wavelength gets reflected. However, alternatively, the second dichroic beam splitter 24 may be configured such that the image light of the second wavelength is transmitted and the image light of the first wavelength gets reflected.

Figure 3B:
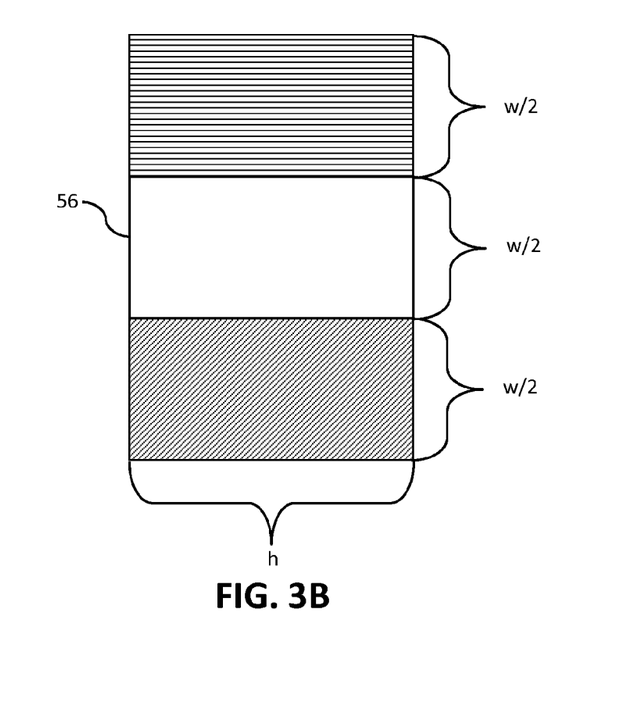
FIG. 3B illustrates an overlap between upper and lower halves of the SLM image in accordance with the present invention.

As noted above, the tilt of the first and second mirrors 20 and 22 at the angle θ causes a shift of the upper and lower halves 52 and 54 when the image light of the first wavelength and the image light of the second wavelength are respectively reflected by those mirrors. More particularly, the upper half 52 of the SLM image 50 is shifted downwards, while the lower half 54 of the SLM image 50 is shifted upwards. When the image lights are recombined, at the final image plane, the shift results in an overlapped portion 56 between the upper and lower halves 52 and 54 of the SLM image 50, as shown in FIG. 3B. In the illustrative embodiment, in the overlapped portion 56, the first-wavelength image of the upper half of the SLM image 50 and the second-wavelength image of the lower half of the SLM image 50 are precisely overlaid.

At step 44, the second lens 26 projects the upper half 52 and the lower half 54 of the SLM image 50 to the field stop 28 with the precise overlay. The field stop 28 may be, for example, a diaphragm that allows a passage of light through its center aperture while blocking light outside of the aperture. However, other suitable forms of field stop may be used as well.

Figure 3C:
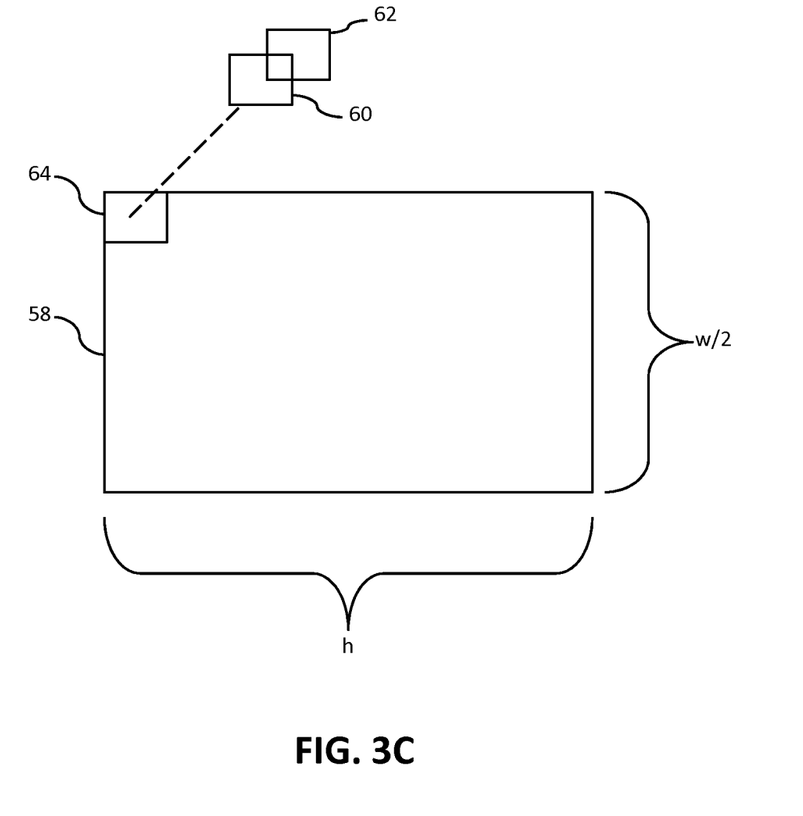
FIG. 3C illustrates an overlap image, in accordance with the present invention.

Then, at step 46, the field stop 28 functions to block unwanted light so that only an overlap image 58 appears at the final image plane, as shown in FIGS. 1 and 3C. As noted above, in the illustrative embodiment, the whole SLM 14 is illuminated with the light of the first wavelength and the light of the second wavelength. As such, the image light of the first wavelength would be present in the upper half 52 and the lower half 54 of the SLM image 50. Similarly, the image light of the second wavelength would be present in the upper half 52 and the lower half 54. After the wavelength separation at the first dichroic beam splitter 18, the SLM image 50 appearing at the first mirror 20 would contain only the image light of the first wavelength (e.g., would appear as a blue image), while the SLM image 50 appearing at the second mirror 22 would contain only the image light of the second wavelength (e.g. would appear as a red image).

As such, as a result of the shift of the SLM image 50 downwards and upwards to overlap the upper half 52 and the lower half 54, a portion of the image light of the first wavelength originally present in the lower half 54 of the SLM image 50 would still be present at the final image plane in a lower SLM half, as shown in FIG. 3B. Similarly, a portion of the image light of the second wavelength originally present in the upper half 52 of the SLM image 50 would still be present at the final image plane in an upper SLM half, as shown in FIG. 3B. Accordingly, the field stop 28 will block unwanted image light of the first wavelength from the lower SLM half, and will block unwanted image light of the second wavelength from the upper SLM half so that only image light corresponding to the overlapped portion 56 passes through the field stop 28, resulting in the overlap image 58. In the illustrative embodiment, the angle θ is set such that the overlap image 58 is about half of the size of the SLM image 50, namely about half the width "w" of the SLM image 50, as shown in FIGS. 3B and 3C. Hence, the aperture of the field stop 28 could be set to the width of the overlap image 58 (e.g., w/2) to let through only the overlap image 58 and block other light. Note that, in other embodiments, it is possible to adjust the angle θ to obtain a smaller degree of overlap between the upper and lower halves 52 and 54 if one does not wish to fully utilize the entire half of the pixel array of the SLM 14. In this case, the size of the aperture of the field stop 28 could be set accordingly to let through only the portion of overlap.

As described above, at the final image plane, the first-wavelength image from the upper half of the SLM 14 and the second-wavelength image from the lower half of the SLM 14 can be merged and precisely overlay each other. As a result, each pixel in the overlap image 58 corresponds to two physically different pixels on the SLM 14 and can be controlled by those two pixels simultaneously: one pixel from the upper half of the SLM 14 and one pixel from the lower half of the SLM 14. As described above, in the present embodiment, the image pattern Ps associated with the first wavelength is loaded to the upper half of the SLM 14, while the image pattern Pl associated with the second wavelength is loaded to the lower half of the SLM 14. This way, the upper half of the SLM 14 controls the first wavelength and the lower half of the SLM 14 controls the second wavelength.

To illustrate, FIG. 3A shows a pixel 60 in the upper half 52 of the SLM image 50 and a pixel 62 in the lower half 54 of the SLM image 50. As set forth above, the upper half 52 of the SLM image 50 corresponds to the upper half of the SLM 14, while the lower half 54 of the SLM image 50 corresponds to the lower half of the SLM 14. Therefore, when the upper half 52 is shifted downwards and the lower half 54 is shifted upwards such that those image halves are overlaying each other, a pixel 64 in the overlap image 58 will correspond to an overlap between the pixels 60 and 62. The pixel 60 corresponds to a pixel of the first color from the upper half of the SLM 14 (e.g., a first row of the upper half of the pixel array of the SLM 14) and the pixel 62 corresponds to a pixel of the second color from the lower half of the SLM 14 (e.g., a first row of the lower half of the pixel array of the SLM 14).

As such, since the pixels 60 and 62 are physically two different pixels on the SLM 14, the pixel 64 in the overlap image 58 can be controlled by turning the pixels 60 and 62 on and off on the side of SLM 14. Since the pixels 60 and 62 correspond to physically separate pixels on the SLM 14, they can be turned on and off independent of each other. Hence, the pixel 62 can emit either light associated with the first wavelength (e.g., blue color) or light associated with the second wavelength (e.g., red color), or a mixture of both wavelengths.

Advantageously, in the illustrative embodiment, it is possible to multiplex simultaneous images utilizing only a single SLM to produce a spatially overlaid image of multiple independent colors, such as the overlap image 58. This can have many important applications, such as in microscopy.

To illustrate, projecting simultaneously multiplexed images from a single SLM through a microscope onto a specimen is a powerful tool in applications such as fluorescence microscopy, photoactivation, optogenetics, structured illumination, and others. With a benefit of the present embodiment, one can simultaneously illuminate certain portions of a specimen with light of one color and other portions of the specimen with a light of another color using only a single SLM.

In this regard, the image patterns Ps and Pl can be configured such that when the images of the first and second colors in the upper and lower halves 52 and 54 are overlapped, the overlap image 58 contains desired image shapes for each color (e.g., a red circle and a blue triangle). However, since each pixel in the overlap image 58 can be controlled independently using pixels of multiple different colors on the SLM side, it is possible to create desired color images in the overlap image 58 by selectively controlling individual pixels on the SLM 14. For example, one can modify the initially loaded image pattern or load a new image pattern to change an image of a given color as desired or selectively turn that image on and off, etc.

Note that in the illustrative embodiment, the two mirrors 20 and 22 and the two dichroic beam splitters 18 and 24 are arranged so that not only are images of the two wavelengths overlaid precisely at the final image plane, but also exit pupils of the two images are precisely overlaid on top of each other. More specifically, in the system arrangement of FIG. 1, both exit pupils are at infinity. This is an important feature for microscopy where an exit pupil of a projection system will be imaged at an entrance pupil of the microscope objective in order to maximize light throughput for both wavelengths.

Further, although FIG. 1 shows one illustrative embodiment of the optical imaging system 10, variations are possible.

For example, although in the above description the terms "first wavelength" and "second wavelength" are used respectively in reference to single wavelengths (e.g., a wavelength associated with a particular color (e.g., red or blue)), it should be understood that each of these terms can also represent a band of wavelengths rather than a single wavelength. To illustrate, in one alternative embodiment, the first wavelength can represent a first band of wavelengths, while the second wavelength can represent a second band of wavelengths different from the first band of wavelengths.

Further, although the above description describes an embodiment in which the upper and lower halves of the SLM 14 are being used, in an alternative embodiment, it is also possible to configure the optical imaging system 10 to use right and left halves of the SLM 14 instead, with the left and right halves referring respectively to left and right halves of the pixel array of SLM 14. In this case, two SLM image halves would be shifted respectively in a leftward direction and a rightward direction to overlap them. One skilled in the art will recognize that the angle θ may be adjusted accordingly to generate such shift.

Further, in one alternative embodiment, the first lens 16 may be omitted from the optical imaging system 10. Similarly, the second lens 26 may be omitted as well. Since the first lens 16 would no longer be a part of the system, the angle θ at which the first and second mirrors 20 and 22 are tilted can be generalized as follows:

θ=45°+((⅛)*(angular subtense of an incoming SLM image)), where the incoming SLM image is the SLM image 50 as viewed at a position of the first dichroic beam splitter 18.

As known in the art, an angular subtense generally refers to an angle subtended by a source at a point of measurement. In the present case, the angular subtense of the incoming SLM image would thus generally refer to an angle subtended by the SLM image 50 as viewed from the first dichroic beam splitter 18 positioned at a certain distance "d" away from the SLM 14. The subtended angle may be determined by measuring or calculating an angle whose rays pass through the endpoints of the SLM image 50, as pictorially depicted in FIG. 4.

One should also note that the system arrangement shown in FIG. 1 can also be used for multiplexing optical properties other than a wavelength. For example, in one alternative embodiment, if the dichroic beam splitters are replaced by polarization beam splitters, then it is possible to multiplex two images with different polarizations together. Practically, in this embodiment, for the polarization multiplexing to work optimally, it is more suitable to have the lower half of the SLM 14 to pass through a polarization beam splitter that would replace the second dichroic beam splitter 24, and the upper half of the SLM 14 to be reflected by the same polarization beam splitter.

In yet another alternative embodiment, it is possible to add additional stage(s) of dichroic beam splitters and mirrors so that one can generate, for example, a four-wavelength image by using a single SLM. For example, the SLM 14 can be divided into four quadrants, with each quadrant responsible for one wavelength. The light source 12 can be configured to provide light of four different wavelengths. The first stage will shift the image quadrants up and down in a similar fashion as described in connection with the arrangement of FIG. 1. The second stage, on the other hand, will shift an image at the output of the first stage left and right so that at the end of the second stage, one will have a final image having a size of a single quadrant. Each pixel in the final image corresponds to four physically different pixels in the SLM array. Modulation of each of the four physical pixels allows for a control of four different wavelengths in the final image.

As noted above, in the illustrative embodiment, the whole SLM 14 is illuminated with the light of the first wavelength and the light of the second wavelength. However, in another embodiment, one can arrange to have the upper half of the SLM 14 illuminated only with the light of the first wavelength, and the lower half of the SLM 14 illuminated only with the light of the second wavelength. In this case, the image light of the first wavelength would be present only in the upper half 52 of the SLM image 50 and the image light of the second wavelength would be present only in the lower half 54 of the SLM image 50. Hence, after the wavelength separation at the first dichroic beam splitter 18, the lower half 54 of the SLM image 50 appearing at the first mirror 20 would be dark, and the upper half 52 of the SLM image 50 appearing at the second mirror 22 would also be dark. After the image shift, the upper and lower halves 52 and 54 would be precisely overlaid. However, unlike in the scenario shown in FIG. 3B, other portions of the SLM image 50 would be dark since each half of the SLM array was only illuminated with light of one given wavelength.

As a result, one would not need the field stop 28 at the final image plane. Furthermore, in this case, the dichroics may be replaced by neutral beamsplitters (e.g., partial mirrors) if optical efficiency is not a great concern.

Multiplex System with a Fiber Array

Figure 4:
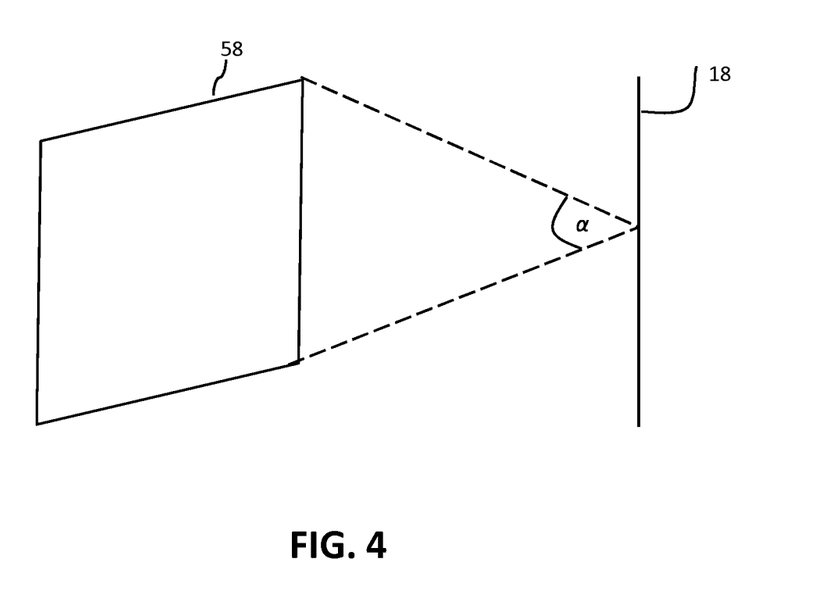
FIG. 4 illustrates an example of an angular subtense in accordance with the present invention.
Figure 5:
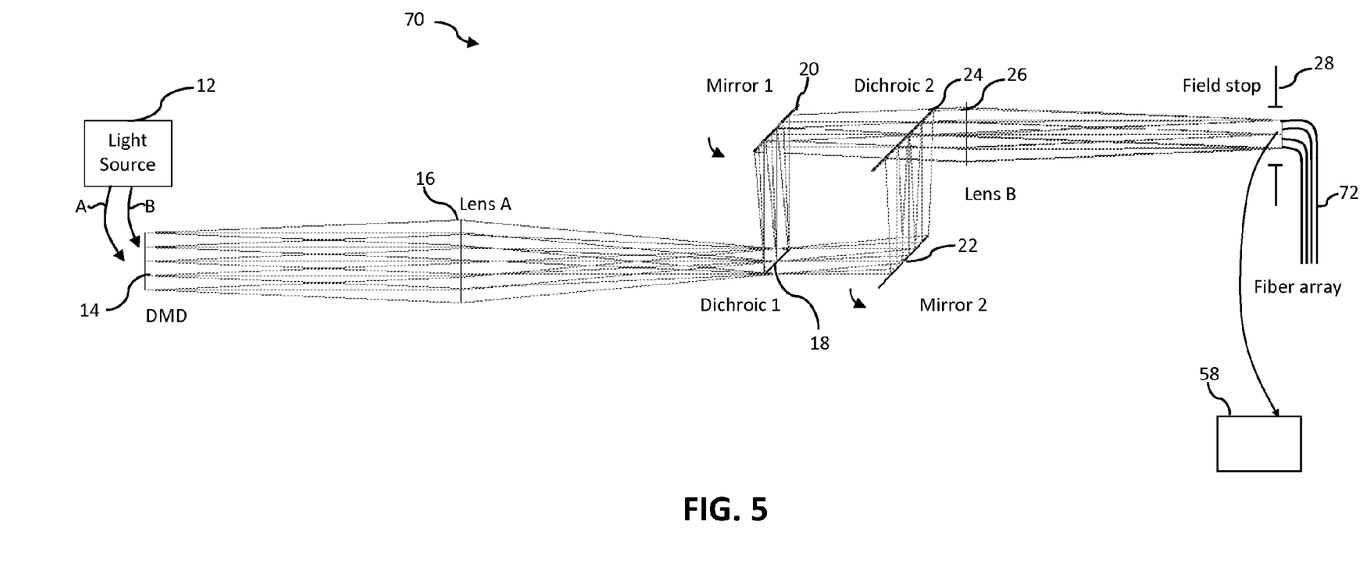
FIG. 5 illustrates an optical imaging system arranged in accordance with another embodiment of the present invention.

FIG. 5 shows an optical imaging system 70, which is a modified version of the optical imaging system 10 of FIG. 1, in accordance with another embodiment. As shown in FIG. 4, the optical imaging system 70 is identical to the optical imaging system 10, except for an addition of a fiber array 72 coupled on the output of the field stop 28 at the final image plane at which the overlap image 58 is produced. In turn, FIG. 6 is a flow chart illustrating an exemplary set of functions carried out in the optical imaging system 70 in accordance with the this embodiment.

In the present embodiment, the fiber array 72 is a furcated fiber bundle made up of multiple individual optical fibers through which light can be transmitted. In one example, such fiber array may be formed by bundling optical fibers, and polishing their ends. The fiber array 72 may be coupled onto the output of the field stop 28 directly (e.g., by placing the fiber array 72 at the output of the field stop 28) or by means of any suitable optical component(s) to direct light coming out of the field stop 28 into the fiber array 72.

Figure 6:
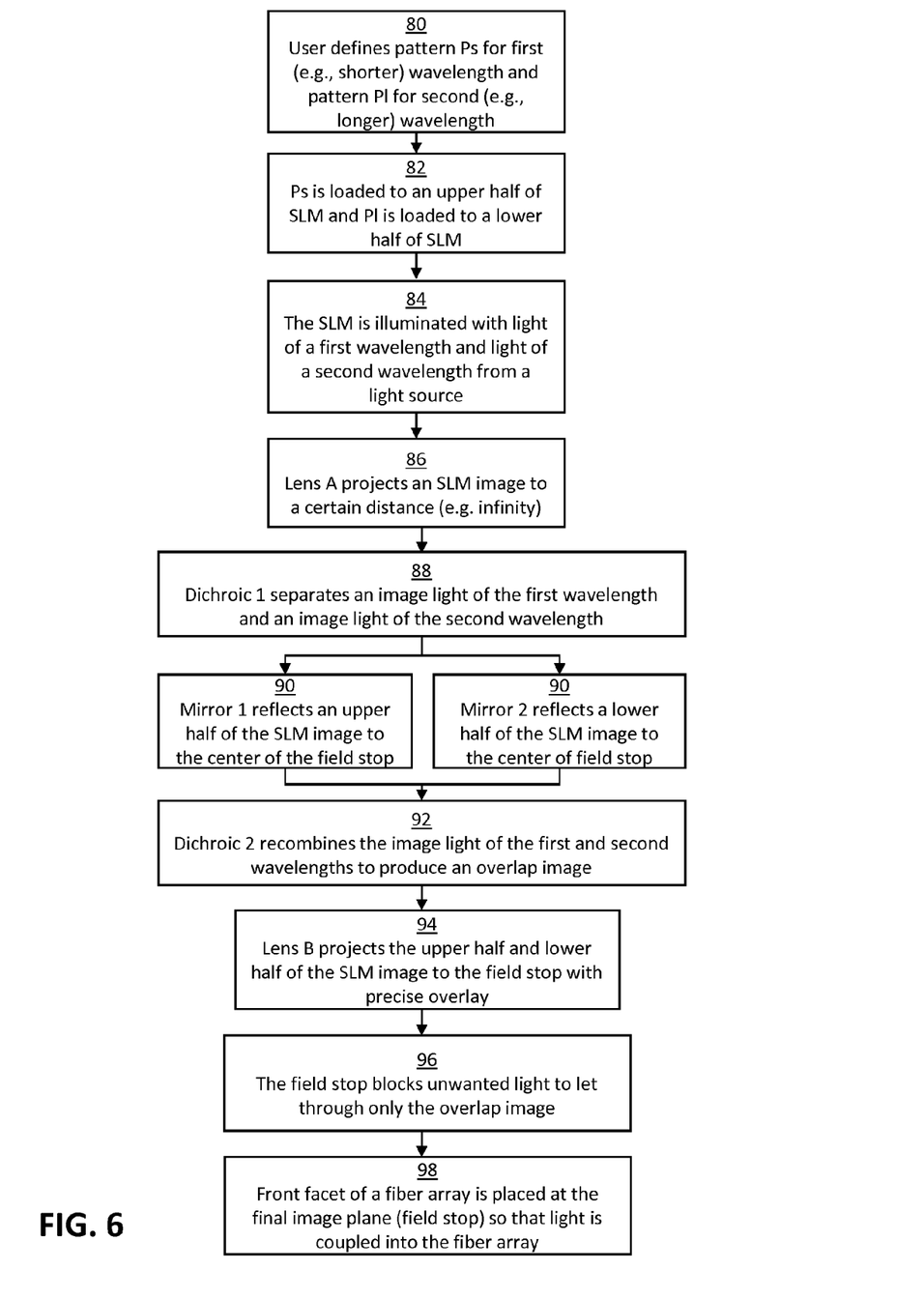
FIG. 6 is a flow chart showing an exemplary set of functions carried out using the optical imaging system of FIG. 5.

As shown in FIG. 6, the set of functions 80-96 is the same as the set of functions 30-46 shown in FIG. 2. Therefore, the description of those steps will not be repeated here. However, in the system arrangement of FIG. 5, at step 98, a front facet (or a common end) of the fiber array 72 is placed at the final image plane (or the field stop 28) so that light is coupled into the fiber array 72. As such, the overlap image 58 is projected onto a front facet (or a common end) of the fiber array 72.

Accordingly, pixels on the SLM 14 corresponding to pixels within the overlap image 58 may be precisely mapped to individual fibers in the fiber array 72. As discussed above, each pixel in the overlap image 58 corresponds to multiple physically different pixels in the array of the SLM 14. Hence, in one example, the fiber array 72 may be configured such that each individual optical fiber corresponds to each pixel in the overlap image 58, and hence two physically different pixels on the SLM 14. Alternatively, it may be possible to configure the fiber array 72 such that each individual optical fiber corresponds to multiple pixels in the overlap image 58, and hence to more than two physically different pixels on the SLM 14.

Advantageously, with the present embodiment, light in each individual optical fiber of the fiber array 72 can be independently modulated by the SLM 14. This results in a fiber array light source with multiple individually-controlled light outputs that each can produce light of multiple wavelengths.

The present embodiment can be beneficially applied in different applications that use fiber array light sources. For example, in optogenetics, it may be desirable to stimulate some specimens in numerous different places (e.g., 20 or even 100 different places). Coupling an individual light source into each optical fiber of such light source is highly impractical. With a benefit of the present embodiment, only a limited number of light sources illuminating the DMD is needed to get a desired light out of each optical fiber of the fiber array 72. Each optical fiber may be controlled by particular pixels on the SLM 14. Those pixels can be selectively turned on and off in order to control whether light of one or more of multiple wavelengths is sent through that fiber or not.

In another example, in optogenetics research, each individual optical fiber of the fiber array 72 can be inserted into a different part of a brain in order to activate and silence different parts of the brain. The availability of two or more simultaneous wavelengths enables researchers to have fully independent control of the activating and silencing patterns.

Additionally, one unique feature of the fiber array light source of the present embodiment is that light transmission rate in each fiber can be trimmed by turning a certain number of pixels off. For example, if an optical fiber is covered by 10 pixels, then turning one of the pixels off results in a 10% reduction of the light intensity in the optical fiber. This mechanism differs from the pulse-width modulation (PWM) employed in the operation of micromirror devices. PWM causes intensity fluctuations, but the intensity trimming features described above keep a constant light intensity.

Note that, as in the case of the arrangement of FIG. 1, variations are possible. In this regard, various modifications and alternative embodiments discussed above with respect to the optical imaging system 10 could equally apply to the optical imaging system 70. As one example, as discussed above in connection with FIG. 1, in one alternative embodiment, the SLM 14 may be illuminated the light of the first wavelength and the light of the second wavelength such that the field stop 28 is not needed at the final image plane.

Additionally note that, in certain cases, the field stop 28 may not be needed when coupling light into the fiber array 72. More particularly, if the fiber array 72 is smaller than the overlap image 58 (e.g., a front facet of the fiber array 72 is smaller than an area of the overlap image 58), then normally there would be no need for the field stop 28, since no optical fiber in the fiber array 72 will see light outside of the overlap image area. Similarly, if the fiber array 72 is equal in size to the overlap image 58, it may be possible to omit the field stop 28. In general, from a practical standpoint, there is no need for the fiber array 72 to be larger than the overlap image 58. However, if that is the case, then the field stop 28 can be used to blocked unwanted light.

Further, as described above in connection with the system arrangement of FIG. 1, both exit pupils are at infinity. This would also be the case in the system arrangement of FIG. 5. Not only it is a feature for microscopy, as discussed above, but it is also a feature for coupling light into the fiber array 72 because it ensures that a numerical aperture of each fiber is fully filled with both wavelengths.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B are satisfied by any one of the following: A is true (or present) and B is false (or not present), A is false (or not present) and B is true (or present), and both A and B are true (or present).

The terms "a" or "an," as used herein, are defined as one or more than one. The term "plurality," as used herein, is defined as two or more than two. The term "another," as used herein, is defined as at least a second or more.

The invention can be implemented in numerous ways, including as a process, an apparatus, and a system. In this specification, these implementations, or any other form that the invention may take, may be referred to as techniques. In general, the order of the connections of disclosed apparatus may be altered within the scope of the invention.

The present invention has been described in particular detail with respect to some possible embodiments. Those skilled in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead be performed by a single component. An ordinary artisan should require no additional explanation in developing the methods and systems described herein but may nevertheless find some possibly helpful guidance in the preparation of these methods and systems by examining standard reference works in the relevant art.

These and other changes can be made to the invention in light of the above detailed description. In general, in the following claims, the terms used should not be construed to limit the invention to the specific embodiments disclosed in the specification and the claims, but should be construed to include all methods and systems that operate under the claims set forth herein below. Accordingly, the invention is not limited by the invention, but instead its scope is to be determined entirely by the following claims.

What is claimed is:

1. An optical imaging system, comprising:
   a spatial light modulator (SLM) that receives light of a first wavelength and light of a second wavelength, and outputs an image light of the first wavelength and an image light of the second wavelength, the first and second wavelengths being different from each other;
   a first dichroic beam splitter that receives the image light of the first and second wavelengths from the SLM, and reflects the image light of the first wavelength in a first direction and transmits the image light of the second wavelength in a second direction;
a first mirror that receives the image light of the first wavelength from the first dichroic beam splitter and reflects the image light of the first wavelength at a first angle;
a second mirror that receives the image light of the second wavelength from the first dichroic beam splitter and reflects the image light of the second wavelength at a second angle;
a second dichroic beam splitter that receives the image light of the first wavelength from the first mirror and the image light of the second wavelength from the second mirror, and recombines the image light of the first and second wavelengths to produce an overlap image; and
a fiber array that receives light associated with the overlap image.

2. The optical imaging system of claim 1, wherein the fiber array comprises multiple individual optical fibers through which light can be transmitted.

3. The optical imaging system of claim 2, wherein the overlap image is projected onto a common end of the fiber array.

4. The optical imaging system of claim 3, wherein the common end of the fiber array is a front facet of the fiber array.

5. The optical imaging system of claim 2, wherein the fiber array is a furcated fiber bundle.

6. The optical imaging system of claim 2, wherein:
each pixel in the overlap image corresponds to two physically different pixels on the SLM; and
each optical fiber in the fiber array corresponds to at least one pixel in the overlap image.

7. The optical imaging system of claim 6, wherein each optical fiber in the fiber array corresponds to at least two physically different pixels on the SLM.

8. The optical imaging system of claim 7, wherein:
a first pixel on the SLM is associated with the light of the first wavelength;
a second pixel on the SLM, different from the first pixel, is associated with the light of the second wavelength; and
an optical fiber in the fiber array corresponding to the first and second pixels selectively provides an output light of the first wavelength, an output light of the second wavelength, and an output light of both the first and second wavelengths.

9. The optical imaging system of claim 2, wherein:
the SLM comprises a first half and a second half;
the first half corresponds to a first half of a pixel array of the SLM,
the second half corresponds to a second half of the pixel array of the SLM,
in the overlap image, the first half of the SLM controls the image light of the first wavelength;
in the overlap image, the second half of the SLM controls the image light of the second wavelength; and
each optical fiber in the fiber array corresponds to one pixel from the first half of the SLM and one pixel from the second half of the SLM.

10. The optical imaging system of claim 9, wherein the pixel from the first half and the pixel from the second half are selectively turned on and off to control light in the optical fiber.

11. The optical imaging system of claim 9, wherein:
the first half is an upper half, and
the second half is a lower half.

12. The optical imaging system of claim 9, wherein:
the first half is a right half, and
the second half is a left half.

13. The optical imaging system of claim 9, wherein:
the first half is loaded with a first image pattern, the first image pattern being associated with the first wavelength; and
the second half is loaded with a second image pattern, the second image pattern being associated with the second wavelength.

14. The optical imaging system of claim 13, wherein the first wavelength is associated with a first color and the second wavelength is associated with a second color.

15. The optical imaging system of claim 1, wherein the first wavelength is associated with a first color and the second wavelength is associated with a second color.

16. The optical imaging system of claim 1, wherein (i) the first wavelength is a shorter wavelength and the second wavelength is a longer wavelength, or (ii) the first wavelength is a longer wavelength and the second wavelength is a shorter wavelength.

17. The optical imaging system of claim 1, wherein the overlap image comprises an upper image half associated the first wavelength and a lower image half associated with the second wavelength, the two image halves overlapping each other.

18. The optical imaging system of claim 1, wherein the overlap image comprises a right image half associated with the first wavelength and a left image half associated with the second wavelength, the two halves overlapping each other.

19. The optical imaging system of claim 1, wherein the first angle and the second angle are calculated according to the following formula:

$$\theta = 45° + ((\tfrac{1}{8}) * (\text{angular subtense of an incoming SLM image})),$$

where,
the incoming SLM image is an SLM image as viewed at a position of the first
dichroic beam splitter.

20. The optical imaging system of claim 1, further comprising a first lens, coupled between the SLM and the first dichroic beam splitter, that receives the image light of the first wavelength and the image light of the second wavelength from the SLM, and that projects the image light of the first and second wavelengths for a specified distance.

21. The optical imaging system of claim 19, wherein the first angle and the second angle are calculated according to the following formula:

$$\theta = 45° + \operatorname{atan}(w/(8*F_a)), \text{ where}$$

atan is arctangent,
w is a width of an SLM image, and
$F_a$ is a focal length of the first lens.

22. The optical imaging system of claim 1, further comprising:
a field stop; and
a second lens that receives the recombined image light of the first and second wavelengths from the second dichroic beam splitter, and forms an output image of the SLM at the field stop.

23. The optical imaging system of claim 22, wherein the fiber array is coupled onto an output of the field stop.

24. The optical imaging system of claim 22, wherein light coming out of the field stop is directed into the fiber array.

25. The optical imaging method, comprising:
using a single spatial light modulator (SLM) to produce an image having a first image half associated with a first wavelength and a second image half associated with a second wavelength,
shifting the first image half in a first second direction and shifting the second image half in a second direction different from the first direction such that at least a portion of the first image half overlaps at least a portion of the second image half; and
outputting the overlapped portions as an overlap image associated with the first and second wavelengths, and projecting the overlap image onto a fiber array.

26. The optical imaging method of claim 25, wherein the fiber array comprises multiple individual optical fibers through which light can be transmitted.

27. The optical imaging method of claim 26, wherein the overlap image is projected onto a common end of the fiber array.

28. The optical imaging method of claim 27, wherein the common end of the fiber array is a front facet of the fiber array.

29. The optical imaging method of claim 26, wherein the fiber array is a furcated fiber bundle.

30. The optical imaging method of claim 26, wherein:
each pixel in the overlap image corresponds to two physically different pixels on the SLM; and
the overlap image is projected onto the fiber array such that each optical fiber in the fiber array corresponds to at least one pixel in the overlap image.

31. The optical imaging method of claim 26, wherein each optical fiber in the fiber array corresponds to multiple physically different pixels on the SLM.

32. The optical imaging method of claim 31, wherein the SLM includes a first pixel, the first pixel being associated with a light of the first wavelength, and a second pixel different from the first pixel and being associated with a light of the second wavelength, the method further comprising:
controlling the first pixel and the second pixel on the SLM such that an optical fiber in the fiber array corresponding to the first and second pixels selectively provides an output light of the first wavelength, an output light of the second wavelength, and an output light of both the first and second wavelengths.

33. The optical imaging method of claim 31, wherein light transmission in each optical fiber is reduced by turning off a number of the pixels corresponding to the optical fiber.

34. The optical imaging method of claim 26, further comprising:
independently modulating light of at least two different wavelengths in each optical fiber using the SLM.

35. The optical imaging method of claim 26, wherein:
the SLM comprises a first half and a second half,
in the overlap image, the first half of the SLM controls the first image half associated with the first wavelength,
in the overlap image, the second half of the SLM controls the second image half associated with the second wavelength, and
each optical fiber in the fiber array corresponds to one pixel from the first half of the SLM and one pixel from the second half of the SLM.

36. The optical imaging method of claim 35, wherein:
the first half is an upper half, and
the second half is a lower half.

37. The optical imaging method of claim 35, wherein:
the first half is a right half, and
the second half is a left half.

38. The optical imaging method of claim 25, wherein:
the first image half is shifted in the first direction and the second image half is shifted in the second direction such that the first image half and the second image half overlay each other.

39. The optical imaging method of claim 25, wherein the first wavelength is associated with a first color and the second wavelength is associated with a second color.

* * * * *